United States Patent
Szymkowiak

(10) Patent No.: US 11,560,835 B2
(45) Date of Patent: Jan. 24, 2023

(54) INTERNAL COMBUSTION ENGINE WITH VARIABLE COMPRESSION RATIO AND MECHANISM FOR CHANGING THE COMPRESSION RATIO

(71) Applicant: Miroslaw Szymkowiak, Leszno (PL)

(72) Inventor: Miroslaw Szymkowiak, Leszno (PL)

( * ) Notice: Subject to any disclaimer, the term of this patent is extended or adjusted under 35 U.S.C. 154(b) by 0 days.

(21) Appl. No.: 17/279,156

(22) PCT Filed: Sep. 23, 2019

(86) PCT No.: PCT/IB2019/058013
§ 371 (c)(1),
(2) Date: Mar. 24, 2021

(87) PCT Pub. No.: WO2020/065486
PCT Pub. Date: Apr. 2, 2020

(65) Prior Publication Data
US 2021/0396173 A1 Dec. 23, 2021

(30) Foreign Application Priority Data
Sep. 26, 2018 (PL) .......................... 427198

(51) Int. Cl.
*F02B 75/04* (2006.01)
*F02B 75/22* (2006.01)
(Continued)

(52) U.S. Cl.
CPC .......... *F02B 75/045* (2013.01); *F02B 75/228* (2013.01); *F02D 15/02* (2013.01); *F16C 3/22* (2013.01); *F16C 2360/22* (2013.01)

(58) Field of Classification Search
CPC ...... F02B 75/045; F02B 75/044; F02B 75/04; F02B 2075/027; F02B 75/228; F16C 3/00;
(Continued)

(56) References Cited

FOREIGN PATENT DOCUMENTS

| CN | 108104958 A | * | 6/2018 | .............. F02B 75/04 |
| DE | 112016001786 T5 | * | 12/2017 | ............ F02B 75/045 |

(Continued)

OTHER PUBLICATIONS

Written Opinion of The International Searching Authority dated Dec. 16, 2019.
Polish Patent Office search report dated Feb. 19, 2019.

*Primary Examiner* — George C Jin
*Assistant Examiner* — Teuta B Holbrook
(74) *Attorney, Agent, or Firm* — Law Office of Jason H. Rosenblum, PLLC

(57) ABSTRACT

Combustion engine with a variable compression ratio which, according to the invention, includes the following items: engine body, crankshaft with crank pins mounted rotatably in the body, cylinders, pistons connected to the crankshaft via pin connecting rod sand control arms as well as the control arm rod located inside the engine body, with eccentrics mounted on it, on which eccentrics for each piston there are separately mounted control arms, it is characterized by the fact that on the control arm rod (19) aside from the rigidly mounted eccentrics (18), on which single control arms (14) are rotatably mounted, there are also rotatably mounted eccentrics (23), on which single control arms (14) are rotatably mounted, where preferably on the eccentrics (18) are mounted the control arms (14) for one row of cylinders (5), while for the eccentrics (23) are mounted the control arms (14) for the other row of cylinders (5), additionally the engine contains a mechanism for changing the compression ratio consisting of the control arm rod (19) with eccentrics (18, 23) mounted on the control arm rod (19) as well as coupling elements that connect the elements of the mechanism which ensure that neighboring eccentrics (18, 23) rotate in opposite directions.

26 Claims, 11 Drawing Sheets

Figure 1:
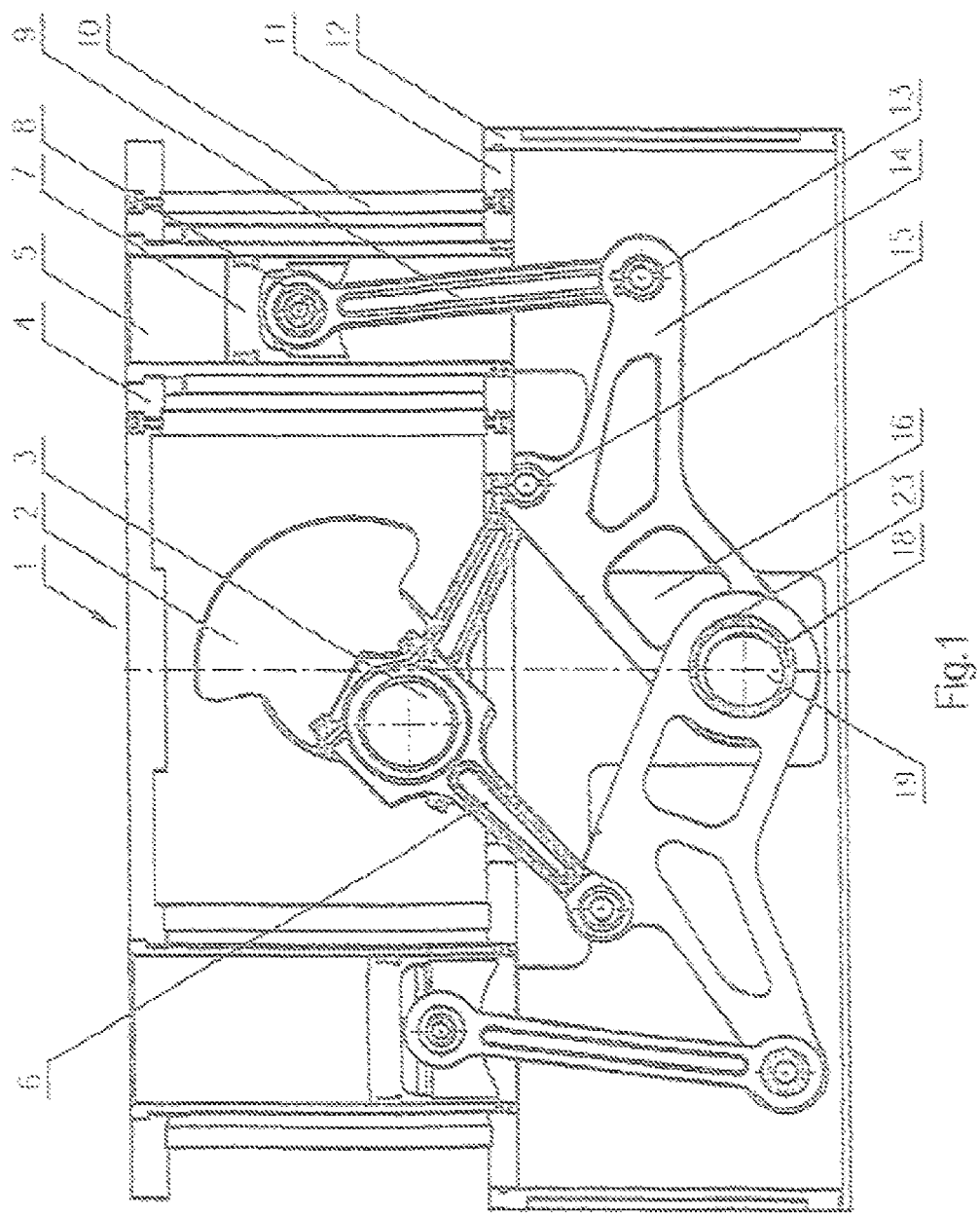

(51) Int. Cl.
  *F02D 15/02* (2006.01)
  *F16C 3/22* (2006.01)
(58) Field of Classification Search
  CPC ...... F16C 3/04; F16C 3/28; F16C 7/06; F02D 15/02
  See application file for complete search history.

(56) References Cited

FOREIGN PATENT DOCUMENTS

| FR | 2825756 A1 | * | 12/2002 | ............ F02B 75/047 |
|---|---|---|---|---|
| GB | 2219836 | | 12/1989 | |
| JP | 2001263114 | | 9/2001 | |
| JP | 2007285132 A | * | 11/2007 | |
| JP | 2010133374 | | 6/2010 | |
| WO | WO-0140641 A1 | * | 6/2001 | .............. F02B 75/04 |
| WO | 2013160 | | 10/2013 | |
| WO | WO-2014056291 A1 | * | 4/2014 | ............ F02B 75/048 |

* cited by examiner

INTERNAL COMBUSTION ENGINE WITH VARIABLE COMPRESSION RATIO AND MECHANISM FOR CHANGING THE COMPRESSION RATIO

CROSS-REFERENCE TO RELATED APPLICATIONS

This application claims the benefit of PCT Patent Application No. PCTIB2019058013 published as WO/2020/065486 filed Sep. 23, 2019 which claims benefit of Polish Patent Application No. P.427198, titled "INTERNAL COMBUSTION ENGINE WITH VARIABLE COMPRESSION RATIO AND MECHANISM FOR CHANGING THE COMPRESSION RATIO," filed by Miroslaw SZYMKOWIAK, on Sep. 26, 2018.

This application incorporates the entire contents of the foregoing application(s) herein by reference.

The proposed invention is the internal combustion engine with variable compression ratio and a mechanism for changing the compression ratio in it. The invention can be among others applicable as the internal combustion engine with a variable compression ratio, especially in the version of a two-row (two lines of cylinders) multi-cylinder internal combustion engine. It may also be used in other piston devices, such as a pump or a compressor. The invention can be considered as a variant of a conrod-crank mechanism in the classical internal combustion engine. Following the invention, the engine crankshaft is rotatably coupled to a mechanism used for varying the compression ratio, and the expansion stroke is preferably the longest.

Polish Patent No. 225176 describes a piston device with compression-expansion chambers, in particular a combustion engine, a compressor or a pump with a crank and piston mechanism and a control arm. The device, according to this invention operating as a combustion engine, has a crank and the piston mechanism consisting of: the crankshaft, connecting rod, control arm rod, control arm, camshaft, piston, cylinder, and head all being a part of the engine body.

In the case of a device used as a multi-row engine, preferably a two-row engine, the crankshaft axis is located in space between the rows of cylinders that are located on the opposite sides of the crankshaft axis. In one version, the control arm rod is rotatably mounted in the engine body, and its axis is parallel to the axis of the crankshaft. The control arm rod has an eccentricity on which a double-armed control arm is mounted. Each piston is connected to the connecting rod with a single control arm. The eccentricity (eccentric) is rigidly connected to the control arm rod, such as via a wedge, which means that it rotates with the crankshaft in the same direction. The pistons moving in cylinders with reciprocating movement connected by connecting rods with the control arm mounted on the control arm rod cause swinging movement of the control arm, and by connecting the control arm through the connecting rod with the crankshaft, which also results in the rotary movement of the crankshaft mounted in the engine body. The crankshaft is connected to the pistons via a control arm and connecting rods.

A known piston device with compression-expansion chambers equipped with a crankshaft piston mechanism with control arm allows obtaining a variable ratio of compression by rotating the control arm rod with the eccentricities, that are stiffly connected with the control arm rod. On these eccentricities there are control arms mounted and they are moving in swinging motion.

The design of a crankshaft mechanism with a control arm in the known piston device especially in a two-row multi-cylinder engine, makes it impossible to achieve the intended, preferably the same compression ratio set externally for all cylinders during operation. This is a drawback to the known reciprocating piston device.

A multi-cylinder combustion engine, especially in a two-row cylinder configuration with a mechanism for varying the compression ratio in which the crankshaft is rotatably coupled to it, which among others results in the piston path in the expansion stroke being the longest as it would be preferred, is a solution not known in the priorly mentioned designs.

In order to eliminate the above inconvenience, a piston device equipped with a mechanism for changing the compression ratio and the mechanism for changing the compression ratio itself have been developed, one that ensures that the same ratio of compression is obtained in each cylinder of the device during its operation.

Combustion engine with variable compression ratio, according to the invention described, consists of the following: a body, a crankshaft with crank pins mounted to rotate in the body, cylinders, pistons connected to the crankshaft through tension pins, connecting rods and control arms and a control arm rod located on the body, on which eccentricities are mounted, and with self-pivoting control arms for each piston on these eccentricities, it is characterized by the fact that on the control arm rod, apart from rigidly mounted eccentricities on which control arms are pivoting, there are also pivoting eccentricities on which control arms are pivoting, while preferably there are control arms for just one row of cylinders embedded on the first eccentricity, and control arms for the second cylinder row on the second eccentrics. In addition, the engine contains a mechanism for varying the compression ratio consisted of as follows: the control arm rod with eccentricities mounted on it and the coupling elements used to join the mechanism elements and give eccentricities opposite rotation directions. The control arm rod has an axial hollow lubrication channel with open endings sticking out of the control arm rod at the points of rotatable mounting of the control arm rod, control arm and eccentricities, which comprise the lubrication system of the compression ratio adjustment mechanism.

In the first variant of the engine, the mechanism for changing the compression ratio has a control arm rod with eccentricities mounted thereon and a control shaft rotatably mounted in the fixtures connected to them with bolts, which are connected to the body, and some eccentricities are rigidly mounted on the control arm rod, while the other eccentricities are rotatably mounted thereon. On the control shaft, coupling elements are rigidly fixed, what interact with coupling elements mounted on the control arm rod eccentricities, and the control shaft is connected to the control arm rod by means of: coupling element rigidly mounted on the control arm rod, intermediate coupling element rotatably mounted in the fixtures of the body, and a coupling element rigidly mounted on the control shaft, where the intermediate coupling element is located between the other coupling elements, the control shaft being parallel to the control arm rod and having an axial hollow lubrication channel with open ends sticking out of the control arm rod at its rotational mounting positions and coupling elements that are preferably in the form of toothed wheels.

In the second variant of the engine, the mechanism for changing the compression ratio has a control arm rod with eccentricities mounted thereon and two control shafts rotatably mounted in the fixtures connected to them via screws, which are connected to the body, and on the control shaft there are rigidly mounted coupling elements, that are connected with the coupling elements rigidly mounted on eccentricities which are rotatably mounted on the control arm rod. The control shafts are connected with each other, whereas each of the control shafts is parallel to the control arm rod and has an axial hollow lubrication channel with open ends sticking out of the control arm rod at its rotatable mounting positions and coupling elements that are preferably in the form of toothed wheels.

In the third variant of the engine, the mechanism of changing the compression ratio has a control arm rod with eccentrics mounted thereon and is devoid of a control shaft and has an coupling element mounted on the eccentrics, a coupling element rigidly mounted on the control arm rod, which through an intermediate coupling element whose axis is perpendicular to the axis of the control arm rod is coupled with the eccentrics rotatably mounted on the control arm rod, where the coupling elements are preferably in the form of toothed wheels. In this variant, the intermediate coupling element is rotatably mounted in the fitting connected to the body element via screws being rotatably mounted in a common batten.

In the fourth variant of the engine, the mechanism of changing the compression ratio has a control arm rod with eccentrics mounted thereon and is devoid of a control shaft and all eccentrics mounted on the control arm rod have coupling elements mounted on them that are interconnected via indirect coupling elements that are perpendicular to the axis of the control arm rod, where through the interaction of the coupling elements, adjacent eccentrics are coupled together, one of which is mounted on the control arm rod rotatably, while the other is mounted rigidly. The coupling elements are preferably in the form of toothed wheels. In this variant, the intermediate coupling elements are pivotably mounted in the fittings connected to the body element with bolts or are rotatably mounted in a common batten.

In a four-stroke engine structure variant, preferably multi-row, multi-cylinder internal combustion engine, especially in a two-row cylinder version, the engine crankshaft is pivotally coupled through the clutch to the step variation mechanism in a ratio of 1:2 and rotates at twice the speed of the eccentrics mounted on the control arm rod. In this variant, the piston path in each cycle is different, and preferably the piston path in the expansion stroke is the longest, and the piston is in the top dead center—TDC—after the crankshaft rotation by an angle of 720 degrees.

In a four-stroke engine structure variant, preferably multi-row, multi-cylinder internal combustion engine, especially in a two-row cylinder version, the engine crankshaft is pivotally coupled to the compression ratio change mechanism via the intermediate crankshaft and clutch in a ratio of 1:2 and rotates at twice the speed of intermediate crankshaft rotation and the oscillation period of eccentrics mounted on the control arm rod in the range of their oscillation angle less than 180 degrees corresponding to two revolutions of the crankshaft, preferably the piston path in the expansion stroke is the longest. In this version, the intermediate crankshaft axis is located outside of the plane formed by the engine crankshaft axis and the control arm rod axis.

The mechanism for varying the compression ratio in a combustion engine according to the invention of an engine with a variable compression ratio is characterized by a control arm rod rotatably mounted in the engine block, with eccentrics mounted on it, and which the single control arms pivotably mounted on those eccentrics as well as having coupling elements for connecting the mechanism elements and causing neighboring eccentrics to rotate in opposite directions.

The control arm rod has hollow lubrication channels with open ends reaching outside of the control arm rod thus forming the lubrication system.

In the first variant, the mechanism has a control shaft rotatably mounted in the fixtures connected with screws to the engine body, and with some eccentrics rigidly mounted on the control arm rod, while having the other eccentrics rotatably mounted on the control arm rod. Coupling elements are fixed rigidly on the control shaft, which interacts with coupling elements mounted on the control arm rod eccentrics, and the control shaft is preferably coupled to the control arm rod by: a coupling element rigidly mounted on the control arm rod, an intermediate coupling element rotatably mounted in the body fixture and a coupling element rigidly fixed to the control shaft, where the intermediate coupling is arranged between the fixed coupling elements and the control shaft being parallel to the control arm rod and having an axial hollow lubrication channel. The coupling elements are preferably in the form of toothed wheels.

In the second variant, the mechanism has two control shafts rotatably mounted in fixtures connected with screws to the engine body, and on the control shafts coupling elements are rigidly mounted, that are coupled with the coupling elements rigidly mounted on eccentrics which are rotatably mounted on the control arm rod. The control shafts are coupled with each other with aid of coupling elements, whereas each of the control shafts is parallel to the control arm rod and has an axial hollow lubrication channel. The coupling elements are preferably in the form of toothed wheels.

In the third variant, the mechanism is devoid of a control shaft and has a coupling element mounted on the eccentrics, a coupling element rigidly mounted on the control arm rod, which through an intermediate coupling element with an axis perpendicular to the axis of the control arm rod is coupled with the eccentric rotatably mounted on the control arm rod, where the coupling elements are preferably in the form of toothed wheels. In this variant, the intermediate coupling element is rotatably mounted in the fitting element connected to the body with screws being rotatably mounted in a common batten.

In the fourth variant, the mechanism is devoid of a control shaft and all eccentrics mounted on the control arm rod have coupling elements mounted on them that are interconnected via indirect coupling elements that are perpendicular to the axis of the control arm rod, where through the interaction of the coupling elements, neighboring eccentrics are coupled together, one of which is mounted on the control arm rod rotatably, while the other is mounted rigidly. The coupling elements are preferably in the form of toothed wheels. In this variant, the intermediate coupling elements are rotatably mounted in the fittings connected to the body element with screws or are rotatably mounted in a common batten.

The design and operation of the compression ratio adjustment mechanism causes a change in the compression ratio in the cylinders of the device, and with the assumed constructional elements of the device, it produces the same degree of compression in each cylinder of the device during its operation.

Figure 2:
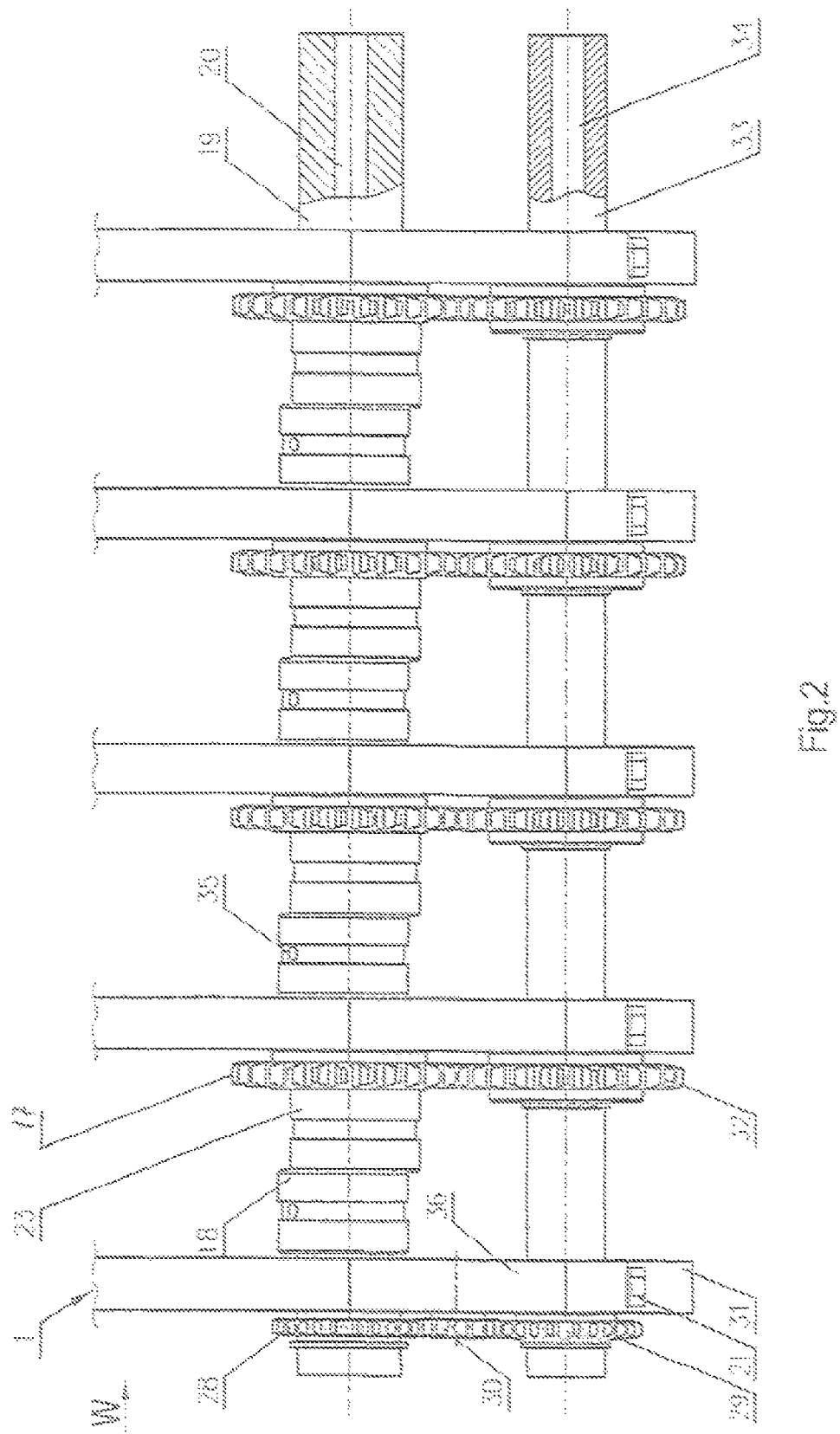
Figure 3:
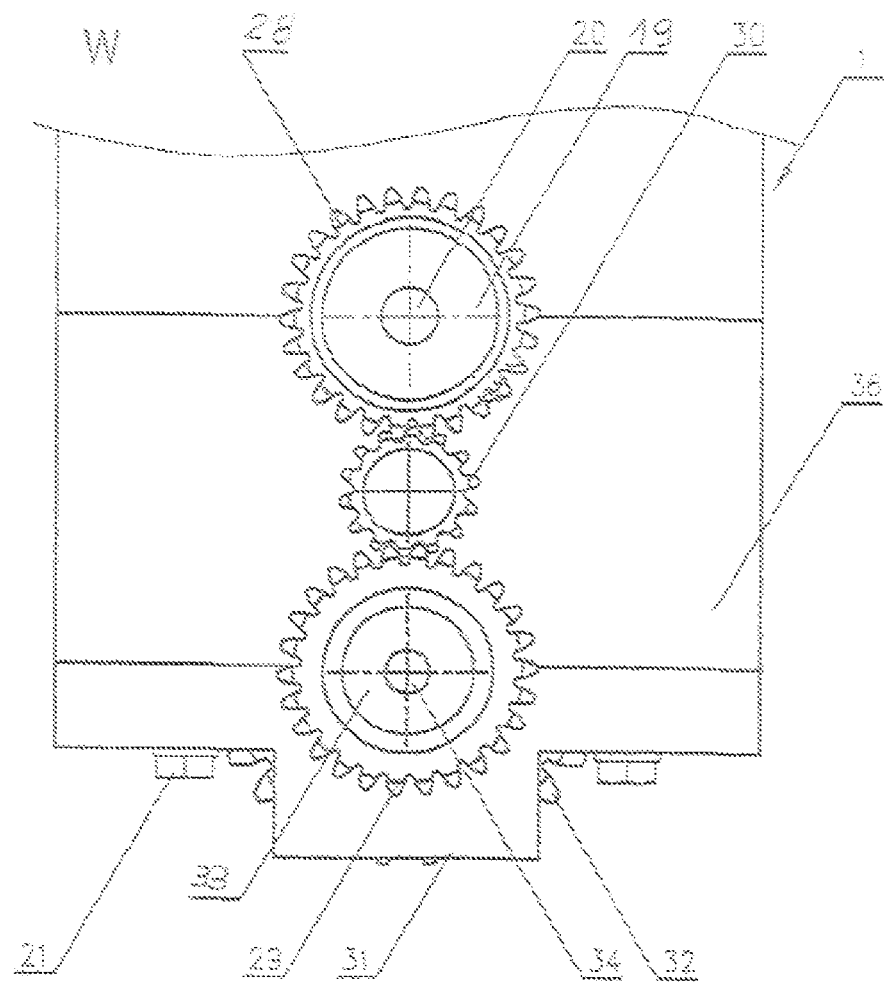

The subject of the invention is shown in the figures where FIG. 1 shows a cross-section of the combustion engine with variable compression ratio, FIG. 2—mechanism for changing the compression ratio in a version with a control shaft, FIG. 3. Mechanism for changing the compression ratio from FIG. 2 in W-view, FIG. 4—mechanism for changing the compression ratio with two control shafts, FIG. 5—mechanism for changing the compression ratio from FIG. 4 in A-view, FIG. 6—mechanism for changing the compression ratio in a version without a control shaft, FIG. 7—mechanism for changing the compression ratio in a different version without a control shaft, FIG. 8—mechanism for changing the compression ratio from FIG. 6 with a batten, FIG. 9—mechanism for changing the compression ratio from FIG. 7 with a batten, FIG. 10—a combustion engine in a four-stroke structure variant, preferably multi-row, multi-cylinder internal combustion engine, especially a two-row cylinder version with a mechanism for changing the compression ratio, FIG. 11—an internal combustion engine in another four-stroke structure variant, preferably multi-row, multi-cylinder internal combustion engine, especially in a two-row cylinder version with a mechanism for changing the compression ratio.

A cross-section of a combustion engine with a variable compression ratio shown in FIG. 1, such as a two-row multi-cylinder combustion engine consists of a body 1 with the elements 4, 10, 11, 12, 16, crankshaft 2 with crank pins 3 rotatably mounted in the body 1, with cylinders 5, pistons 7 connected with crankshaft 2 through pins 8, 13, 15 and connecting rods 9, 6 and control arm rod 19 rotatably mounted in the elements 16 of the body 1. Eccentrics 18 are mounted on the control arm rod 19 on which for each piston 7 there are separately mounted control arms 14. On the control arm rod 19 in addition to the rigidly mounted eccentrics 18 are also rotatably mounted eccentrics 23. The rigid mounting of the eccentrics 18, such as through a wedge connection causes the eccentrics 18 to rotate with the control arm rod 19. Single control arms 14 are rotatably mounted on the eccentrics 18, 23 where one set of eccentrics 18, is preferably rigidly mounted on the control arm rod 19 for one row of cylinders 5, while the others eccentrics 23 for the second row of cylinders 5 are rotatably mounted on the control arm rod 19.

The internal combustion engine according to the invention has a built-in mechanism for changing the compression ratio which is attached to the control arm rod 19 with eccentrics 18, 23 attached to it, of which preferably the eccentrics 18 for one row of cylinders 5 are rigidly mounted on the control arm rod 19 while the other eccentrics 23 for the second row of cylinders 5 are rotatably mounted on the control arm rod 19. The engine also has coupling elements 28, 29 and 30 enabling, in a variation with the control shaft, the coupling of the control arm rod 19 with the control shaft 33, and in the variant without the control shaft it has the coupling elements 24, 25 and the coupling intermediate element 26 in a perpendicular axis to the control arm rod axis 19 thus connecting the eccentrics 18 and 23 mounted on the control arm rod 19. The coupling of the mechanism elements results in the neighboring eccentrics 18 and 23 to rotate in opposite directions.

Such an interconnection of engine, compressor or pump components allows the engine to convert the reciprocating movement of the pistons 7 into a rotational movement of the crankshaft 2 placed in the engine body 1 or in the case of a pump or compressor converting the rotational movement of the crankshaft into the reciprocating motion of the pistons.

The control arm rod 19 has a hollow lubrication channel 20 with open ends 35 reaching out of the control arm rod 19 at its rotatable mounting positions forming the lubrication system. The control shaft 33 has a hollow lubrication channel 34 as well as openings reaching outside at its rotational mounting points.

The engine in one of the variations of the compression ratio change mechanism shown in FIG. 2 and FIG. 3 is characterized by a control arm rod 19 with a lubrication channel 20 mounted to the engine body 1 and with rigidly mounted coupling element 28, with eccentrics 18 and 23 mounted on the control arm rod 19, of which the eccentrics 23 have a coupling element 17 such as a toothed wheel and are rotatably mounted on the control arm rod 19, while the other eccentrics 18 are mounted rigidly, with at least one control shaft 33 with a lubrication channel 34 rotatably mounted in the fittings 31 that are rigidly connected with screws 21 with fittings 36, which are then rigidly connected with other screws with the engine body 1. Coupling elements 32 are rigidly mounted on the control shaft 33, those can be toothed wheels, connected with coupling elements 17 mounted on the eccentrics 23. The control shaft 33 is coupled with the control arm rod 19 with: a coupling element 28 such as a toothed wheel mounted rigidly on the control arm rod 19, an intermediate coupling element 30 such as a toothed wheel rotatably mounted in the fitting 36 of the engine body 1 as well as coupling elements 29 such as a toothed wheel rigidly mounted on the control shaft 33. The intermediate coupling element 30 is located between the other coupling elements 28, 29. The control shaft 33 is set parallel to the control arm rod 19. The eccentrics 18, preferably for one row of cylinders 5 of the engine are rigidly mounted on the control arm rod 19, and eccentrics 23 for the other row of cylinders 5 are rotatably mounted on the control arm rod 19.

Figure 4:
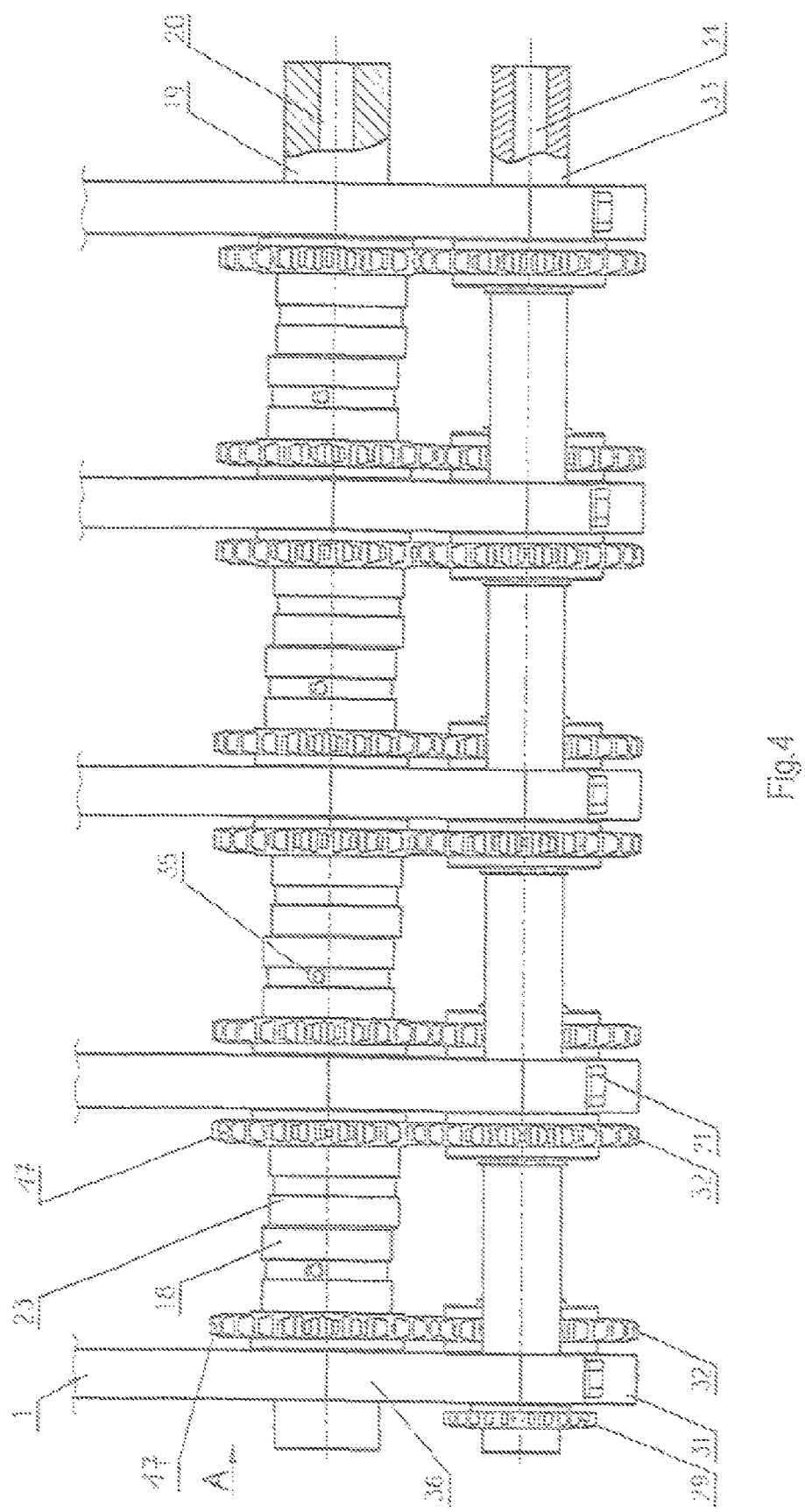
Figure 5:
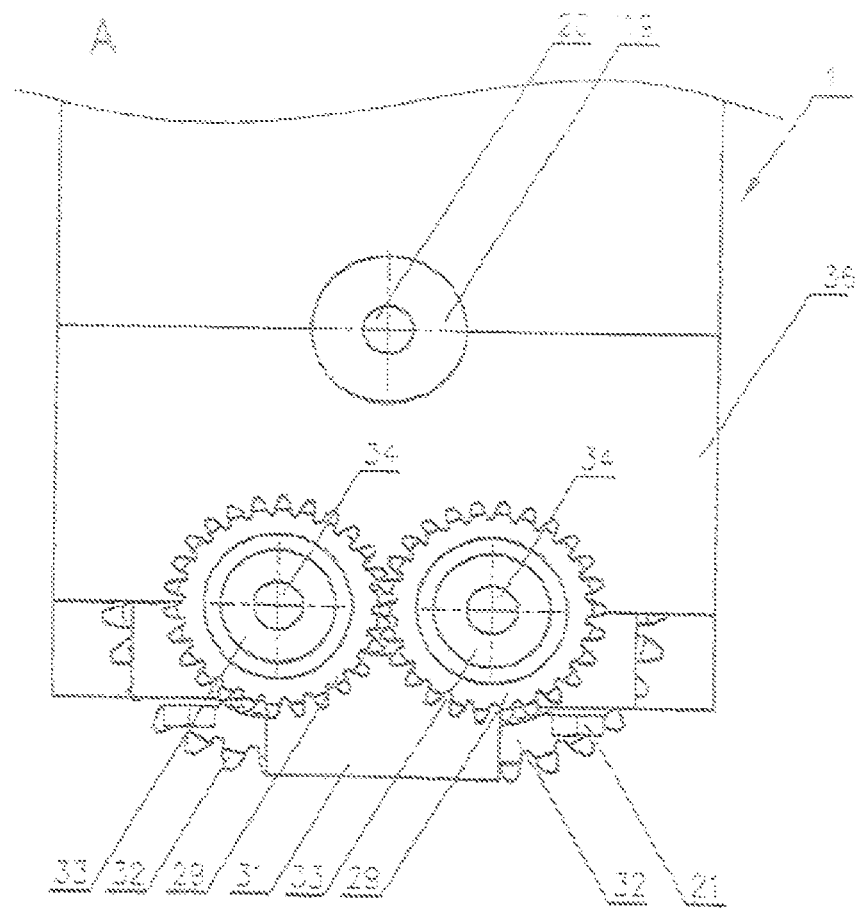

The engine in another variant of the compression ratio changing mechanism shown in FIG. 4 and FIG. 5 is characterized by the mechanism having two control shafts 33 with lubricating channels 34, rotatably mounted in the fittings 31 which are rigidly mounted with screws 21 with the fittings 36, which are then rigidly mounted with other screws on the engine body 1. The control shafts 33 have rigidly mounted coupling elements 32 on them, such as toothed wheels also connected with the coupling elements 17 such as toothed wheels rigidly fixed on the eccentrics 18, 23, which are in turn rotatably mounted on the control arm rod 19. The control shafts 33 are preferably coupled with each other, where the coupling elements 29, can be in the form of toothed wheels. Each of the control shafts 33 is placed in parallel to the control arm rod 19.

Figure 6:
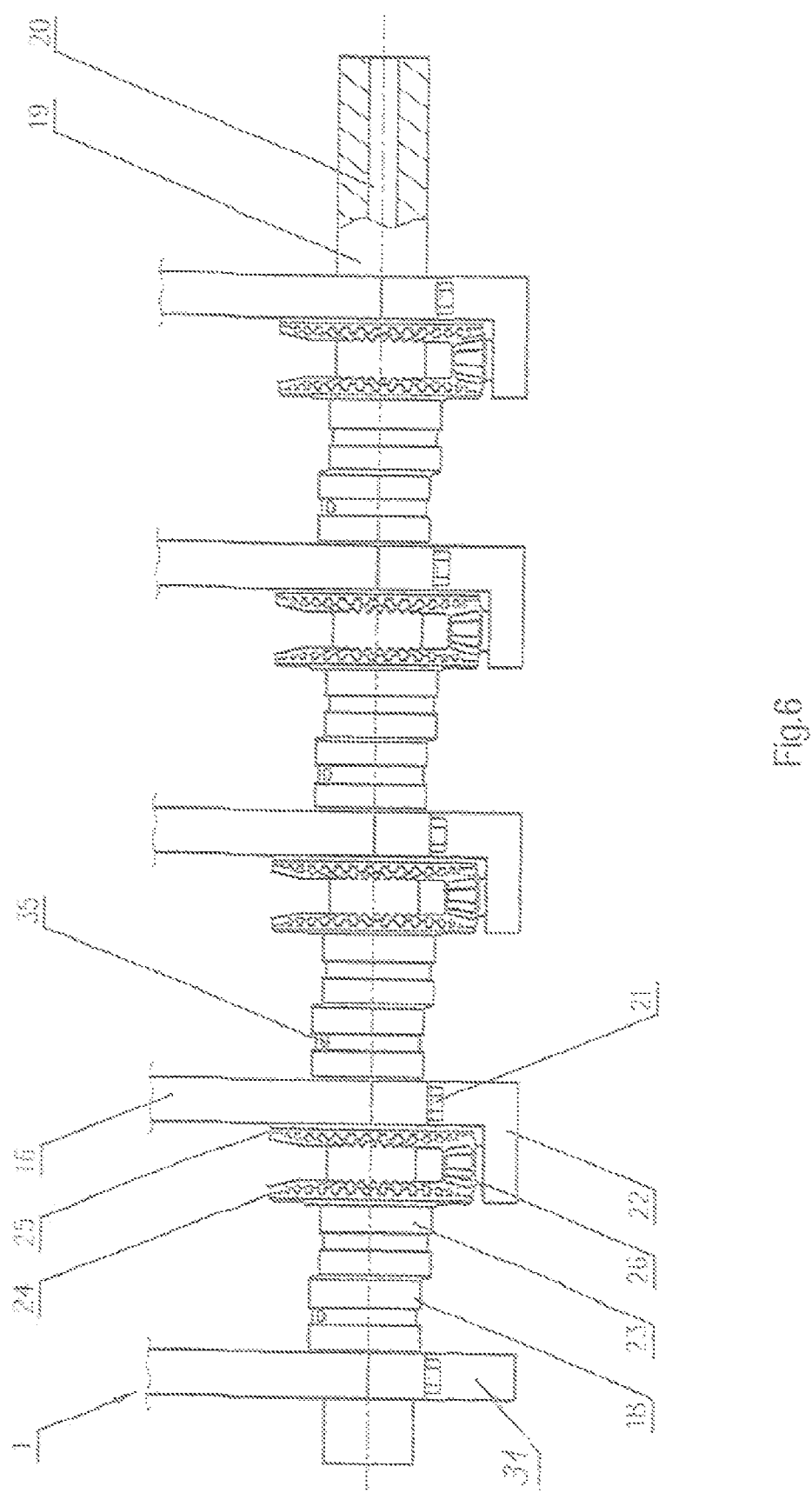
Figure 8:
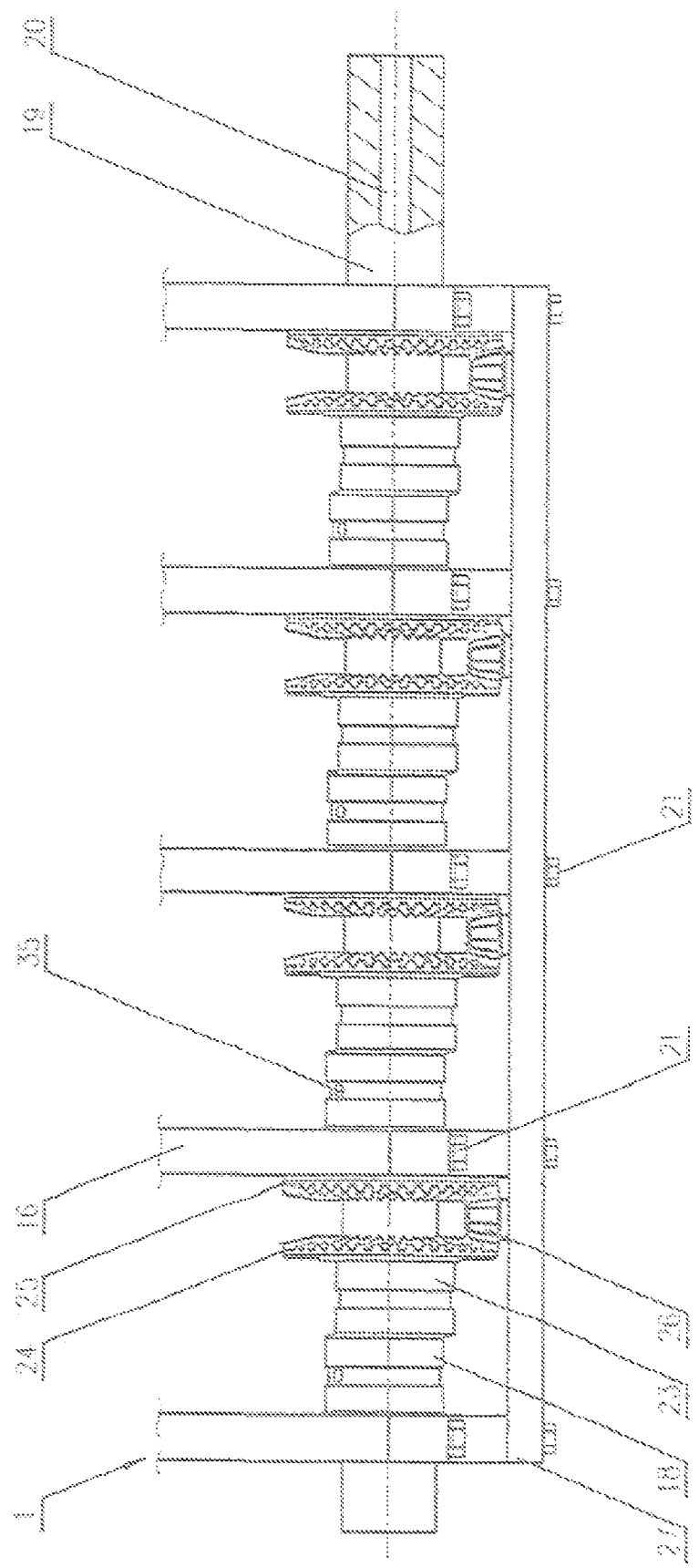

The engine in another variant of the compression ratio change mechanism shown in FIG. 6 and FIG. 8 is characterized by the mechanism not having a control shaft. The mechanism in this case consists of one rotatably mounted control arm rod 19 with a lubrication channel 20 and with eccentrics 18 and 23 mounted on it, of which some eccentrics 23 along with the coupling elements 24 mounted on them, in the form of toothed wheels for example, are rotatably mounted on the control arm rod 19, with a coupling element 25, such as a toothed wheel, rigidly mounted on the control arm rod 19, which through an intermediate coupling element 26 such as a toothed wheel is connected to an eccentric 23 rotatably mounted on the control arm rod 19. The coupling element 26 whose axis is perpendicular to the axis of the control arm rod 19 is rotatably mounted in the fitting 22 connected rigidly with the element 16 of the body 1 by screws 21—as shown in FIG. 6 or rotatably mounted on a common batten 27—as shown in FIG. 8.

Figure 7:
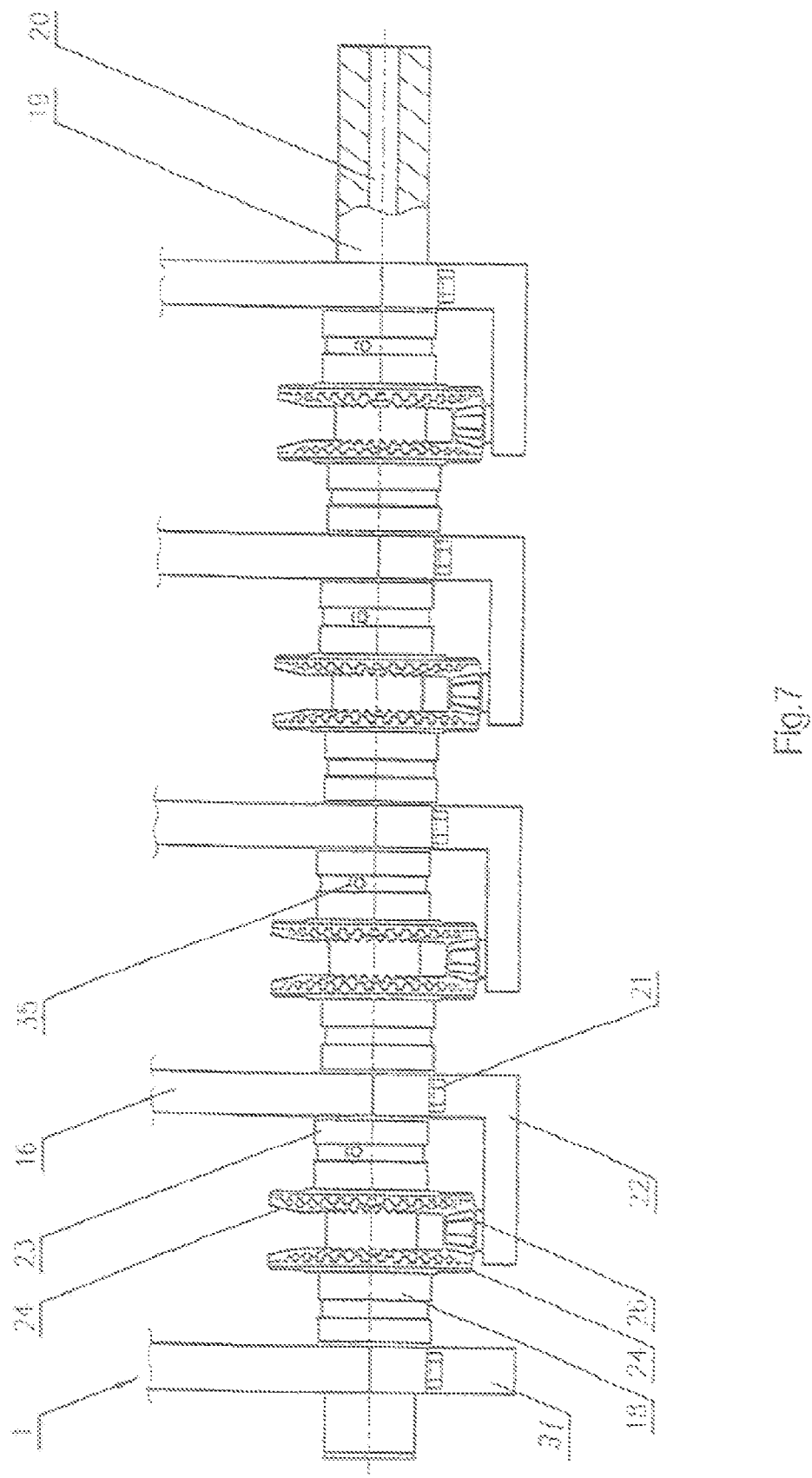
Figure 9:
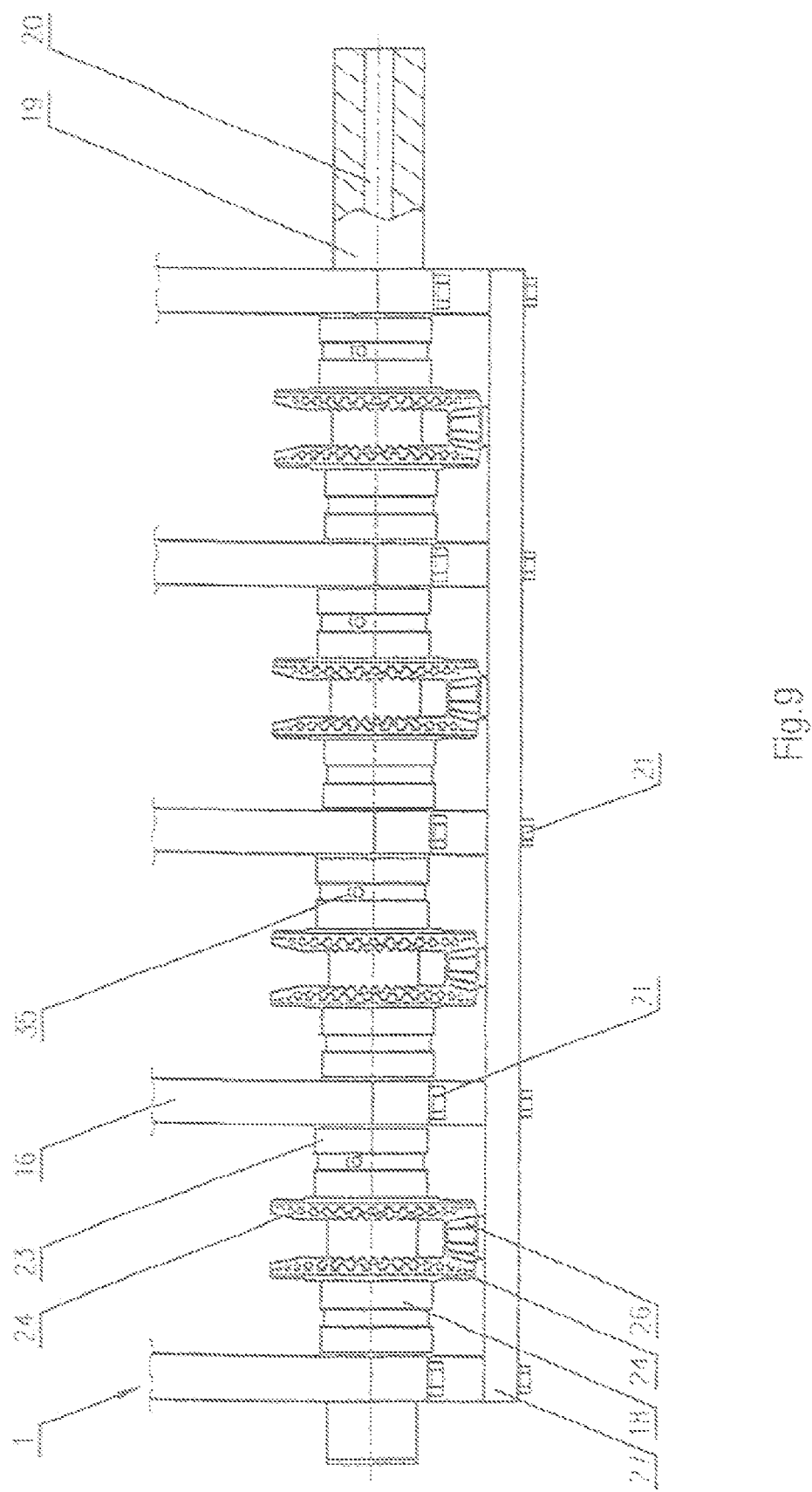

The engine in yet another variation of the compression ratio changing mechanism shown in FIG. 7 and FIG. 9 is characterized by the mechanism not having a control shaft and not having a coupling element rigidly fixed directly on the control arm rod 19. The mechanism in this case consists of a single control arm rod 19 with a lubrication channel 20 rotatably mounted on the engine body 1 and with eccentrics 18, 23 mounted on it. All the eccentrics 18, 23 have coupling elements 24 in the form of toothed wheels mounted on them, which are rotatably connected through coupling elements 26, such as 285 toothed wheels with their axis perpendicular to the control arm rod 19 axis, with the fittings 22 as shown in FIG. 7 or a common batten 27 as shown in FIG. 9. The intermediate coupling element 26 connects the neighboring eccentrics 18, 23, of which the eccentric 23 is mounted rotatably on the control arm rod 19, while the eccentric 18 is mounted rigidly on the control arm rod 19. Each fitting 22 is rigidly connected with the element 16 of the engine body 1 with screws 21.

The combustion engine in a four-stroke multi-row multi-cylinder engine construction variant, in particular a two-row cylinder engine with a control arm and piston mechanism, shown in cross-section in FIG. 1, having a mechanism for changing the compression ratio as specified in the description and claims No. 14 to No. 23 with the control arm and piston mechanism located in the engine body 1 consists of the body 1, crankshaft 2, pistons 7, cylinders 5 and the engine head, a single control arm rod 19 for both cylinder rows 5 with eccentrics 18, 23, control arms 14 mounted rotatably on the eccentrics 18, 23 for each piston 7 separately, connecting rods 9, 6 connecting the piston 7 with the crankshaft 2 via pins 15, 13, 8 and control arm 14, preferably with a compression ratio changing mechanism as specified previously in the description and patent claims No 1 through No 3 and No 5 through No 20 has an operating mechanism, where the piston path is preferably the longest for the expansion stroke, it consists of a toothed wheel 37 mounted on the crankshaft 2 of the engine, rotatably mounted in the body 1, an intermediate crankshaft 40 with a toothed wheel 37 connected to it, connecting rod 39, clutch 41 mounted on the control arm rod 19 and the control arm rod itself 19 with the eccentrics 18, 23 rotatably mounted in the engine body 1. The intermediate crankshaft 40 axis is located outside of the plane created by the control arm rod 19 axis and the crankshaft 2 axis. The control arm rod 19 or control shaft 33 is rotatably coupled through the intermediate crankshaft 40 and connecting rod 39 with the crankshaft 2 in a 2:1 ratio and it performs an oscillating motion at half the engine crankshaft rotation speed 2 in the oscillation angle below 180 degrees, where the eccentrics 18, 23 oscillate once per two crankshaft rotations 2.

The goal of the invention in this construction variant is to achieve the operation of a four-stroke internal combustion engine, in which the path of the piston 7 is preferably the longest in the expansion stroke.

Figure 11:
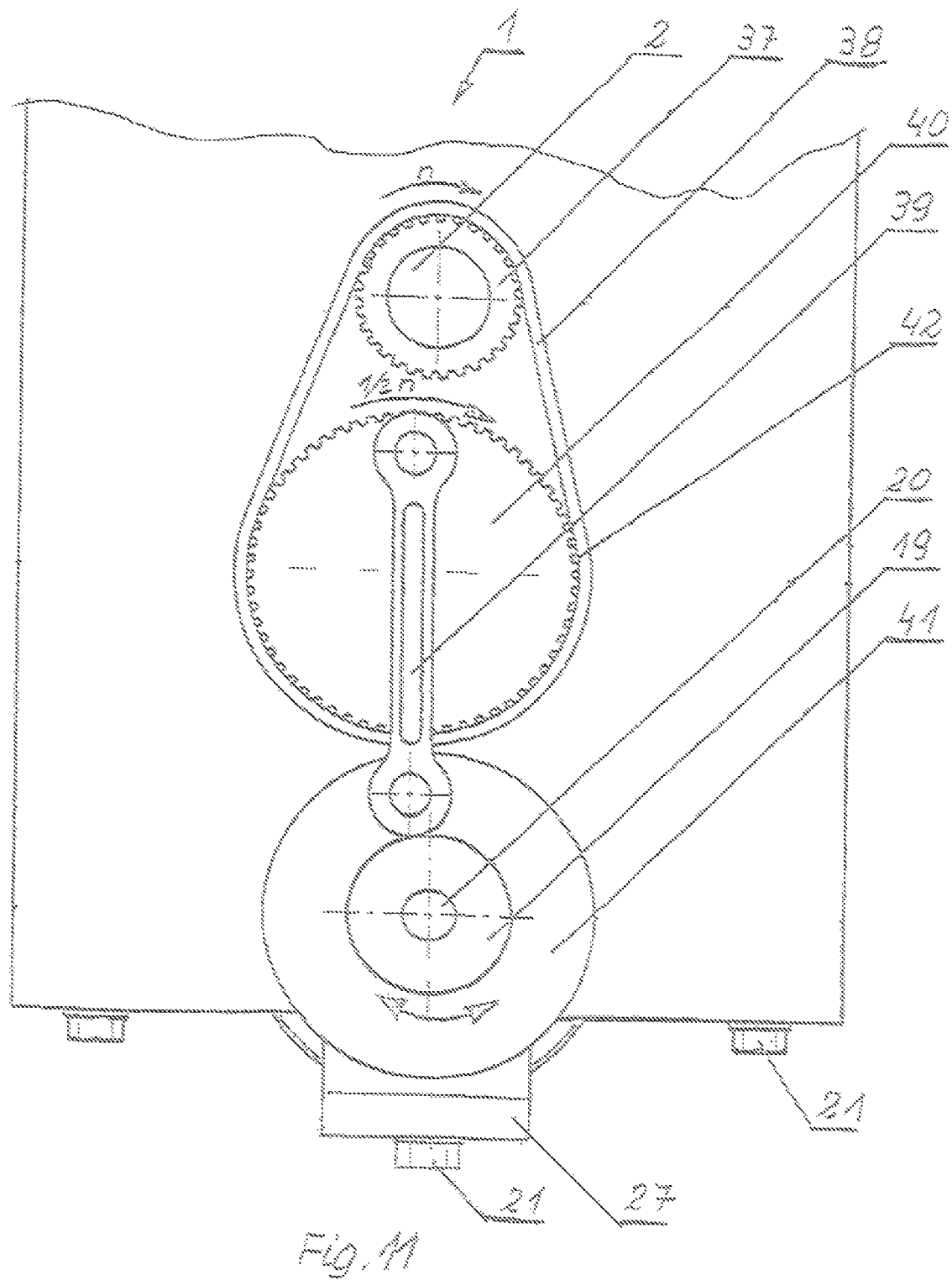

The essence of the invention in the construction variant shown in FIG. 11 is the oscillating motion of the control arm rod 19 or the control shaft 33 and thus the oscillation movement of the eccentrics 18, 23 mounted on the control arm rod 19 in a four-stroke combustion engine as specified in the description and as shown in FIG. 11, which takes place in its angle of oscillation below 180 degrees.

Each rotation of the crankshaft 2 by 360 degrees corresponds to one oscillating motion of the control arm rod 19 by an angle less than 180 degrees. This oscillating motion of the control arm rod 19 is correlated and synchronized with the position and rotation of the crankshaft 2.

The point of the invention and its operation in the proposed construction variant is specified in the description and shown in FIG. 11 where the crankshaft 2 mounted rotatably in the engine body 1 is coupled with the control arm rod 19 through the intermediate crankshaft 40 mounted rotatably in the engine body 1, which through the connecting rod 39 mounted on it and on the control arm rod 19 and the clutch 41 mounted in this construction variant on the control arm rod 19 or in other construction variants mounted on the crankshaft 2 or the control shaft 33, which is not shown on the picture, causes the control arm rod 19 to perform oscillating motion. The intermediate crankshaft 40 coupled rotatably with the crankshaft 2, preferably via toothed wheels 37, 42 mounted on them as well as via a toothed belt 37 or chain in a 2:1 ratio, i.e. the intermediate crankshaft 40 rotates at half the rotation speed of the engine crankshaft 2.

As a result of this coupling and by a connecting rod 39 rotatably mounted on the pin of the intermediate crankshaft 40, which is also mounted rotatably on the other end on the clutch pin 41 mounted on the control arm rod 19 or the control shaft 33 the control arm rod 19 along with the eccentrics 18, 23 mounted on it becomes coupled with the crankshaft 2 and performs an oscillating motion in the angle range below 180 degrees, which causes the oscillation period of the eccentrics 18, 23, which oscillate in the opposite directions to correspond to two rotations of the engine crankshaft 2.

The intermediate crankshaft 40 coupled with the control arm rod 19 and the crankshaft 2 performs a rotational motion at half the crankshaft 2 rotational speed.

In the case of an internal combustion engine construction variant having a compression ratio changing mechanism according to patent 4 with two control shafts 33 described in the previous section and shown in FIG. 4 and FIG. 5, the crank shaft 2 is rotatably coupled in a 2:1 ratio with the control shaft 33 through a mechanism as shown in FIG. 11 with a clutch 41 mounted on one of the rotatably coupled control shafts 33. The clutch 41 can be mounted on the engine crankshaft 2.

Such a coupling between the crankshaft 2 and a given control shaft 33 via a clutch 41, an intermediate crankshaft 40 and a connecting rod 39 results in the opposite direction of the oscillating motion of the coupled control shafts 33 and the coupled with them eccentrics 18, 23 rotatably mounted on the control arm rod 19, where the motion is within the oscillation motion angle range below 180 degrees and oscillating with half the rotational speed of the crankshaft 2 i.e. the eccentrics 18, 23 oscillation period corresponds to two crankshaft 2 rotations.

Figure 10:
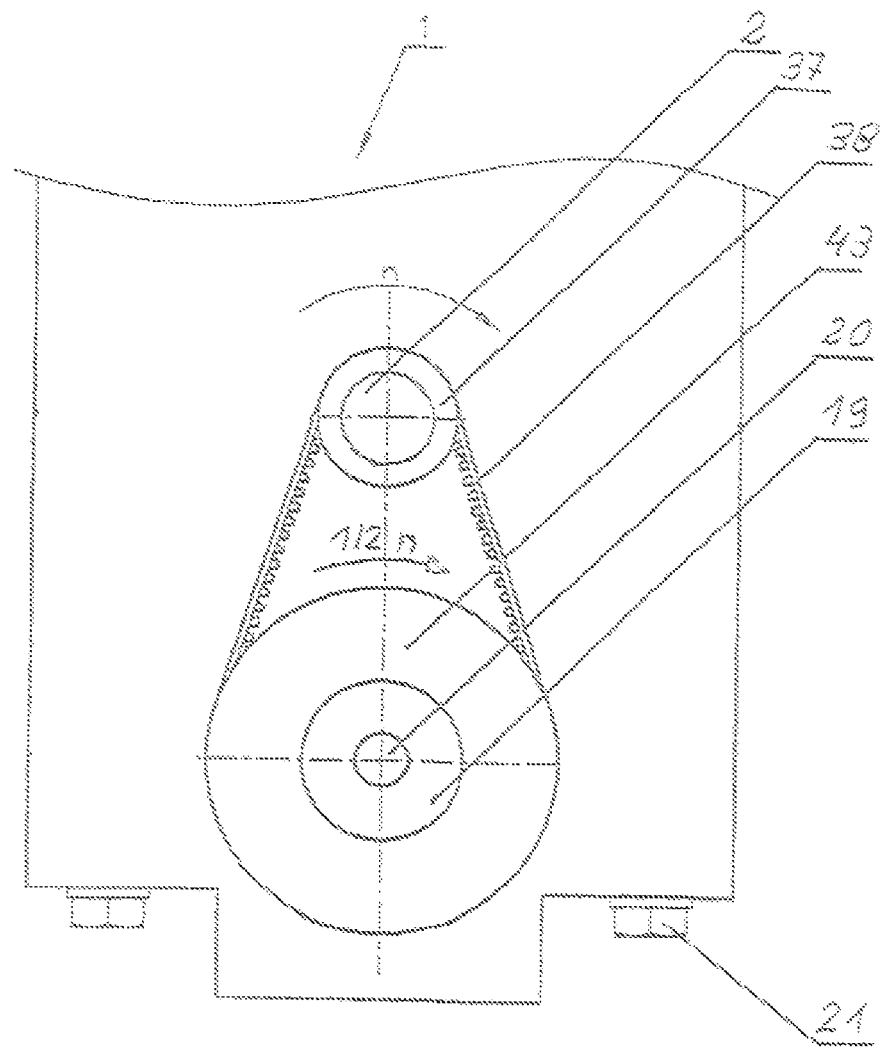

The internal combustion engine in the construction variant shown in FIG. 10 has a control arm rod 19 on which eccentrics 18, 23 are mounted and in this construction variant also a control shaft 33 and crankshaft 2 mounted with a toothed wheel 37, which is coupled rotatably via a toothed belt 38 or via a chain and a clutch with the toothed wheel 43 in a 2:1 ratio, i.e. the control arm rod 19 or control shaft 33 rotates at half the rotational speed of the engine crankshaft 2. The clutch with the toothed wheel 43 can be mounted on the control arm rod 19, as shown in the example on FIG. 10 or alternatively on the crankshaft 2 or on the control shaft 33.

The control arm rod 19 and the control shaft 33 perform rotational motion with half the rotational speed of the engine crankshaft 2 in a correlated and synchronized manner with the speed and position of the engine crankshaft 2. Such a coupling of the control arm rod 19 and eccentrics 18, 23 mounted on it or the control shaft 33 with the crankshaft 2 results in the opposite direction of rotation of the eccentrics 18, 23 rotatably mounted on the control arm rod 19 at half the rotational speed of the engine crankshaft 2 and the motion of the piston 7 is different for each stroke, where preferably the piston pathway would be the longest in the expansion stroke, where the piston reaches its maximum i.e. its TDC point when the crankshaft 2 rotates by 720 degrees.

In the case of an internal combustion engine construction variant with a compression ratio changing mechanism according to the patent claim 4 with two control shafts 33 previously described, and shown in FIG. 4 and FIG. 5, crankshaft 2 is coupled rotatably in 2:1 ratio with the chosen control shaft 33 via a mechanism as shown in FIG. 10 with the clutch 43 mounted on one of the rotatably coupled control shafts 33. The clutch 43 can be mounted on the engine crankshaft 2.

Such a coupling of the crankshaft 2 with a given control shaft 33 via a clutch 43 means that the coupled control shafts 33 and coupled with them eccentrics 18, 23 rotatably mounted on the control arm rod 19 perform a rotational motion at half the rotational speed of the engine crankshaft 2.

The engine in a four-stroke construction variant, preferably multi-row, multi-cylinder internal combustion engine, especially in the two-row cylinder variant, with a mechanism for changing the compression ratio as specified in the description and patent claims No. 14 through No. 23 of the invention is characterized by the engine crankshaft 2 being coupled rotatably with the compression ratio changing mechanism via the clutch with a toothed wheel 43 in a 1:2 ratio and rotates with twice the rotational speed of the eccentrics 18, 23 mounted on the control arm rod 19. The clutch with a toothed wheel 43 is mounted on the crankshaft 2 or on the compression ratio change mechanism i.e. on the control arm rod 19 or the control shaft 33. In this variant the piston stroke 7 is different in each cycle, and preferably the piston 7 path is the longest in the expansion stroke. Piston 7 is located in the top dead center—TDC—after the crankshaft 2 rotation by 720 degrees. In this variant as shown in FIG. 10 the clutch with a toothed wheel 43 was mounted on the control arm rod 19 as an example.

The engine in a four-stroke construction variant, preferably multi-row, multi-cylinder internal combustion engine, especially in the two-row cylinder variant, with a mechanism for changing the compression ratio as specified in the description and patent claims No. 14 through No. 23 of the invention is characterized by the engine crankshaft 2 being coupled rotatably with the compression ratio changing mechanism via the intermediate crankshaft 40 and connecting rod 39 as well as the clutch 41 in a 1:2 ratio and rotates twice faster than the rotational speed of the intermediate crankshaft 40 and the period of oscillation of the eccentrics 18, 23 mounted on the control arm rod 19 corresponds to two rotations of the crankshaft 2. The angle of the eccentrics 18, 23 rotation is below 180 degrees. The clutch 41 is mounted on the crankshaft 2 or on the compression ratio changing mechanism i.e. on the control arm rod 19 or the control shaft 33. The axis of the intermediate crankshaft 40 is located outside the plane of the crankshaft axis 2. Preferably the piston 7 motion is longest in the expansion stroke. The variant shown in FIG. 11 has the clutch 41 mounted on the control arm rod 19.

In the construction variants described previously and shown in FIG. 10 and FIG. 11, the position of the engine crankshaft 2 correlated and synchronized with the position of the eccentrics 18, 23 mounted on the control arm rod.

The operation of the engine in construction variants, where the crankshaft 2 is rotatably coupled in a 1:2 ratio with the compression ratio change mechanism leading to, among others, that the expansion stroke is preferably the longest. The author of this design solution referred to such a cycle henceforth as a Szymkowiak cycle.

The mechanism for changing the compression ratio of a piston device according to the invention in the form of a multi-row multi-cylinder engine, in particular a two-row multi-cylinder internal combustion engine, pump or compressor comprises of a control arm rod 19 mounted inside the engine body 1 with eccentrics 18, 23 mounted on the control arm rod 19. The control arm rod 19 has a lubrication channel 20 with open ends 35 reaching outside of the control arm rod 19 at points where it is rotatably mounted, as well as through the eccentrics 18 and 23 in points where the control arms 14 are mounted on the eccentrics 18 and 23 as well as in locations where they are rotatably mounted on the control arm rod 19, thus forming the lubrication system. Single control arms 14 are rotatably mounted on the eccentrics 18, 23. The mechanism also has coupling elements for connecting the mechanism elements and to make the neighboring eccentrics 18, 23 rotate, preferably in opposite directions.

In one of the compression ratio change mechanism variants shown in FIG. 2 and FIG. 3, the mechanism consists of: an engine body 1 on which a control arm rod 19 with a lubrication channel 20 is rotatably mounted, on which there is a rigidly mounted coupling element 28, and eccentrics 18 and 23 mounted on the control arm rod 19, of which the eccentrics 23 for one row of cylinders 5 have a coupling element 17 such as a toothed wheel and are rotatably mounted on the control arm rod 19, while the other eccentrics 18 for the other row of cylinders 5 are mounted on it rigidly, at least one control shaft 33 with a lubrication channel 34 rotatably mounted in the fixtures 31 rigidly connected with screws 21 with other fixtures 36, that are rigidly connected with other screws to the engine body 1. Coupling elements 32 such as toothed wheels are rigidly mounted on the control shaft 33, and are connected with the coupling elements 17 rigidly mounted on the eccentrics 23. The control shaft 33 is connected with the control arm rod 19 via: a coupling element 28 such as a toothed wheel mounted rigidly on the control arm rod 19, and intermediate coupling element 30 such as a toothed wheel mounted rotatably in the fixture 36 of the body 1 as well as coupling element 29 such as a toothed wheel rigidly mounted on the control shaft 33. The intermediate coupling element 30 is located between the coupling elements 28 and 29. The control shaft 33 is positioned in parallel to the control arm rod 19. The eccentrics 18, preferably for one row of cylinders 5 of the device are mounted rigidly on the control arm rod 19, while the eccentrics 23 from the other row of cylinders 5 are rotatably mounted on the control arm rod 19.

The externally driven rotation of the control arm rod 19 created manually or mechanically by a servomotor, or a stepper motor controlled by signals from the engine control system for example leads to the rotation of the control shaft 33 coupled with it as well as the eccentrics 23 coupled rotatably on the control arm rod 19, whose direction of rotation is opposite to the direction of control arm rod 19 rotation, which also means opposite to the rotation direction of the eccentrics 18 rigidly mounted on the control arm rod 19. Preferably the eccentrics 18 with the control arm 14 mounted on them for one row of cylinders will move in a direction opposite to the eccentrics 23 with the control arm 14 mounted on them for the second row of cylinders. The change in the position of eccentrics 18 and 23 mounted on the control arm rod 19, and hence the control arms 14 mounted on them, as a result of the invention mechanism operation leads to a change in the compression ratio and allows obtaining the desired pressure, preferably of the same value in all cylinders of the device.

In this variant, but in another version, the mechanism for changing the compression ratio does not have an intermediate coupling 30 of the control arm rod 19 with the control shaft 33. In this case, the coupling of the control arm rod 19 with the control shaft 33 is done through a toothed belt or similar. In this variant, but in yet another version, there is no coupling between the control arm rod 19 and the control shaft 33. In this case the control arm rod 19 and the control shaft 33 are rotated independently of each other but their rotations correlate with each other to produce the change of compression ratio in the cylinders.

In another variant of the compression ratio change mechanism shown in FIG. 4 and FIG. 5, the mechanism has two control shafts 33 with lubrication channels 34, that are rotatably mounted in the fittings 31 rigidly connected with screws 21 with fittings 36, which are then rigidly connected to the engine body 1 with other screws. The control shafts 33 have rigidly mounted coupling mechanisms 32, such as toothed wheels coupled with other coupling elements 17 such as toothed wheels that are rigidly mounted on the eccentrics 18, 23 which are then rotatably mounted on the control arm rod 19. The control shafts 33 are preferably coupled with one another via coupling elements 29 that are rigidly mounted on them, where those coupling elements 29, may be in the form of toothed wheels. Each of the control shafts 33 is positioned in parallel to the control arm rod 19.

A given rotation of the control shafts 33 and the eccentrics 18, 23 connected to them causes change in the position of the eccentrics 18, 23 and the control arms 14 mounted on the mas well as preferably identical compression ratio in all the cylinders 5.

In another variant of the compression ratio change mechanism shown in FIG. 6 and FIG. 8, the mechanism does not have a control shaft. The mechanism in this case in the engine body 1 has one rotatably mounted crank shaft 19 with a lubrication channel 20 and eccentrics 18 and 23 mounted on it, of which some eccentrics, for example 23 for one row of cylinders 5 along with the coupling mechanisms mounted on them 24 such as in the form of toothed wheels, are rotatably mounted on the control arm rod 19, and rigidly mounted on the control arm rod 19 coupling element 25 such as a toothed wheel, which via an intermediate coupling element 26 such as a toothed wheels rotatably mounted on the control arm rod 19 via an eccentric 23. The control arm rod rotation 19 causes the eccentrics 23 that are rotatably mounted on the control arm rod 19 to move in a direction opposite to that of the control arm rod rotation 19, and thus in the same direction as the eccentrics 18 for the other row of cylinders 5 rigidly mounted on it. The coupling element 26 with an axis perpendicular to the control arm rod axis 19 is rotatably mounted in the fitting 22 rigidly connected to the element 16 of the engine body 1 via screws 21—as shown in FIG. 6 or is rotatably mounted in a common batten 27—as shown in FIG. 8.

In another variant of the compression ratio change mechanism shown in FIG. 7 and FIG. 9, the mechanism does not have a control shaft and does not have a coupling element, which was rigidly mounted directly on the control arm rod 19. The mechanism in this case consists of a single, rotatably mounted on the engine body 1 control arm rod 19 with a lubrication channel 20 and the eccentrics 18, 23 mounted on it. All the eccentrics 18, 23 have coupling elements 24 such as toothed wheels mounted on them that are rotatably mounted in the fittings 22—as shown in FIG. 7 or on a common batten 27—as shown in FIG. 9 and interacting through the intermediate coupling elements 26 such as toothed wheels whose axis is perpendicular to the axis of the control arm rod 19. The interacting coupling elements 24 connect neighboring eccentrics 18, 23 of which the eccentric 23 is mounted rotatably on the control arm rod 19, while the eccentric 18 is mounted rigidly on the control arm rod 19.

Each fitting 22 is rigidly connected with an element 16 of the engine body 1 with screws 21. Control arms of one of the rows of cylinders 5 are mounted on the eccentrics 18 and the control arms of the second row of cylinders 5 are mounted on the other eccentrics 23.

In all variations of the compression ratio change mechanism the desired change of the compression ratio takes place through the external rotation of the control arm rod 19 or the control shaft 33 and is performed manually or mechanically by, for example, a servomotor, stepper motor or similar, which are coupled, depending on the compression ratio mechanism construction variant with either the control arm rod 19 or the control shaft 33 and are controlled from the engine supply and control system which in turn makes the eccentrics 18, 23 mounted on the control arm rod 19 move in opposing directions preferably resulting in an even compression ratio change in all of the engine cylinders 5.

The desired result of such motion of the eccentrics 18, 23 is preferably achieving the same compression ratio value in all the engine cylinders 5.

What is claimed is:

1. A combustion engine with a variable compression ratio comprising:
    a body,
    a crankshaft with crank pins rotatably mounted in the body,
    cylinders and pistons connected with the crankshaft through pins,
    connecting rods and control arms and, a control arm rod located in the body, on which eccentrics are mounted, with control arms mounted on the eccentrics for each piston separately,
    wherein:
    the eccentrics comprise rigidly mounted eccentrics (18) on the control arm rod (19), and the control arms comprise single control arms (14) rotatably mounted on the rigidly mounted eccentrics,
    the eccentrics further comprise rotatably mounted eccentric (23) on the control arm rod (19), and the control arms comprise single control arms (14) rotatably mounted to the rotatably mounted eccentrics,
    wherein on some eccentrics (18) the control arms (14) are mounted for one row of cylinders (5), and for the other eccentrics (23), the control arms (14) are mounted for the other row of cylinders (5), and,
    wherein the engine comprises a compression ratio change mechanism comprising: the control arm rod (19), with the eccentrics (18, 23) mounted on the control arm rod (19) and, coupling elements configured to connect the mechanism elements.

2. The engine according to claim 1, wherein:
    the control arm rod (19) comprises a lubrication channel (20) with open endings (35) that reach outside of the control arm rod (19) at the points of rotatable mounting of the control arm rod (19), and
    the control arms (14) and the eccentrics (18, 23) all together form the lubrication mechanism of the compression ratio change mechanism.

3. The engine according to claim 1, wherein:
    the compression ratio change mechanism has a control shaft (33) rotatably mounted in fittings (31) connected with screws (21) with fittings (36), that are attached to the engine body (1),
    the eccentrics (18) are rigidly mounted on the control arm rod (19),
    the eccentrics (23) are rotatably mounted on the control arm rod (19), while on the control shaft (33) there are rigidly mounted coupling elements (32), which are connected to the coupling elements (17) mounted on the eccentrics (23) of the control arm rod (19), while the control shaft (33) is coupled with the control arm rod (19) through the interactions of:
- the coupling element (28) rigidly mounted on the control arm rod (19),
- intermediate coupling element (30) rotatably mounted in a fitting (36) of the engine body (1) and the coupling element (29) mounted rigidly on the control shaft (33),
- where the intermediate coupling element (30) is located between the other coupling elements (28, 29),
- while the control shaft (33) is located in parallel to the control arm rod (19) and has a lubrication channel (34) with open endings reaching outside of the control shaft (33) at the points where it is rotatably mounted, and
- the coupling elements (28, 30, 29, 17, 32) are in the form of toothed wheels.

4. The engine according to claim 1, wherein:
the compression ratio change mechanism has two control shafts (33) rotatably mounted in fittings (31,36) connected with screws (21) and attached to the engine body (1),
on the control shafts (33) there are rigidly mounted coupling elements (32) connected with coupling elements (17) that are rigidly mounted on the eccentrics (18, 23) rotatably mounted on the control arm rod (19), while the control shafts (33) are connected with each other via coupling elements (29), and each of the control shafts (33) is located in parallel to the control arm rod (19) and has a lubricating channel (34) with open endings reaching outside of the control shaft (33) at the points where it is rotatably mounted, and
the coupling elements (32, 17, 29) are in the form of toothed wheels.

5. The engine according to claim 1, wherein:
the compression ratio change mechanism has no control shaft (33),
a mounted coupling element (24) is on the eccentrics (23),
a coupling element (25), rigidly mounted on the control arm rod (19), which via the intermediate coupling element (26) with an axis perpendicular to the axis of the control arm rod (19), is rotatably coupled with the eccentric (23),
an eccentric (23) is rotatably mounted on the control arm rod (19), and the coupling elements (24, 25, 26) are in the form of toothed wheels.

6. The engine according to claim 5, wherein the intermediate coupling element (26) is rotatably mounted in a fitting (22) connected with the element (16) of the body (1) with screws (21).

7. The engine according to claim 5, wherein the intermediate coupling element (26) is rotatably mounted in a common batten (27).

8. The engine according to claim 1, wherein:
the compression ratio change mechanism has no control shaft (33),
all the eccentrics (18, 23) mounted on the control arm rod (19) have coupling elements (24) mounted on them, that interact through intermediate coupling elements (26) whose axes are perpendicular to the axis of the control arm rod (19),
where through the interaction of the coupling elements (24), neighboring eccentrics (18, 23) become coupled, of which one eccentric (23) is mounted rotatably on the control arm rod (19), and the other eccentric (18) is mounted rigidly on the control arm rod (19), and
the coupling elements (24, 26) are in the form of toothed wheels.

9. The engine according to claim 8, wherein the intermediate coupling element (26) is rotatably mounted in a fitting (22) connected with the element (16) of the body (1) with screws (21).

10. The engine according to claim 8, wherein the intermediate coupling element (26) is rotatably mounted in a common batten (27).

11. The engine according to claim 1, wherein:
the engine is a four-stroke, multi-row, multi-cylinder internal combustion engine,
the crankshaft (2) is rotatably coupled with the clutch (43) with the compression ratio change mechanism in a 1:2 ratio and rotates at twice the rotational speed of the eccentrics (18, 23) mounted on the control arm rod (19),
where the piston path (7) is different in each cycle,
the piston (7) path is longest in the expansion stroke, and
where the piston (7) is located at the top dead center point after the crankshaft rotation (2) by 720 degrees.

12. The engine according to claim 1, wherein:
the engine is a four-stroke, multi-row, multi-cylinder internal combustion engine,
the crankshaft (2) is rotatably coupled with the compression ratio change mechanism via an intermediate crankshaft (40), a connecting rod (39), and a clutch (41) in a 1:2 ratio and it rotates at twice the rotational speed of the intermediate crankshaft (40),
the oscillation period of the eccentrics (18, 23) mounted on the control arm rod (19) in the angle range of their oscillation below 180 degrees corresponds to two rotations of the crankshaft (2), and
the piston path (7) is longest in the expansion stroke.

13. The engine according to claim 12, wherein the axis of the intermediate crankshaft (40) is located outside of the plane formed by the axis of the crankshaft (2) and the axis of the control arm rod (19).

14. A mechanism of changing the compression ratio in a combustion engine with a variable compression ratio, wherein a control arm rod (19) is rotatably mounted in an engine body (1) with eccentrics (18, 23) mounted on the control arm rod (19), on which there are rotatably mounted control arms (14), and having coupling elements connecting the mechanism elements and configured to induce neighboring eccentrics (18, 23) to rotate in opposite directions.

15. The mechanism according to claim 14, wherein the control arm rod (19) has lubricating channels (20) with open endings (35) reaching outside of the control arm rod (19) that comprise the a lubricating system.

16. The mechanism according to claim 14, wherein:
a control shaft (33) is rotatably mounted in the fittings (31,36) connected with screws (21) and attached to the engine body (1),
the eccentrics (18) are rigidly mounted on the control arm rod (19),
eccentrics (23) are rotatably mounted on the control arm rod (19),
the control shaft (33) has coupling elements (32) rigidly mounted on it, which interact with the coupling elements (17) that are mounted on the eccentrics (23) of the control arm rod (19),
the control shaft (33) is coupled with the control arm rod (19) via a coupling element (28) rigidly mounted on the control arm rod (19), an intermediate coupling element

(30) rotatably mounted in a fitting (36) of the engine body (1) and a coupling element (29) rigidly mounted on the control shaft (33), the intermediate coupling element (30) is positioned in between the coupling elements (28, 29), the control shaft (33) is located in parallel to the control arm rod (19) and has a lubrication channel (34), and the coupling elements (28, 30, 29, 17, 32) are in the form of toothed wheels.

17. The mechanism according to claim 14, wherein:
there are two control shafts (33) rotatably mounted in the fittings (31,36), and connected with screws (21), and attached to the engine body (1)

the control shafts (33) have coupling elements (32) rigidly mounted on them, which interact with the coupling elements (17) that are rigidly mounted on the engine body (1), eccentrics (18, 23) are rotatably mounted on the control arm rod (19), the control shafts (33) are connected by coupling elements (29), each of the control shafts (33) is positioned in parallel to the control arm rod (19) and has a lubrication channel (34), and the coupling elements (32, 17, 29) are in the form of toothed wheels.

18. The mechanism according to claim 14, wherein:
there is no control shaft (33), a coupling element (24) is mounted on the eccentrics (23), the coupling element (25), is rigidly mounted on the control arm rod (19), which, via an intermediate coupling element (26) whose axis is perpendicular to the axis of the control arm rod (19), is rotatably coupled via an eccentric (23) mounted on the control arm rod (19), and the coupling elements (24, 25, 26) are in the form of toothed wheels.

19. The mechanism according to claim 18, wherein the intermediate coupling element (26) is rotatably mounted in a fitting (22) connected to the element (16) of the engine body (1) with screws (21).

20. The mechanism according to claim 18, wherein the intermediate coupling element (26) is rotatably mounted in the common batten (27).

21. The mechanism according to claim 14, wherein:
there is not a control shaft (33)

all the eccentrics (18, 23) mounted on the control arm rod (19) have coupling elements (24) mounted on them, that are connected together via intermediate coupling elements (26) with their axes perpendicular to the axis of the control arm rod (19), due to the interaction of the coupling elements (24), neighboring eccentrics (18, 23) are connected, of which the eccentric (23) is mounted rotatably on the control arm rod (19) while the other eccentric (18) is mounted rigidly on the control arm rod (19), and the coupling elements (24, 26) are in the form of toothed wheels.

22. The mechanism according to claim 21, wherein the intermediate coupling elements (26) are rotatably mounted in a fitting (22) connected to the element (16) of the engine body (1) with screws (21).

23. The mechanism according to claim 21, wherein the intermediate coupling elements (26) are rotatably mounted in the common batten (27).

24. The engine of claim 1, wherein:
The engine comprises a four-stroke, multi-row, multi-cylinder internal combustion engine, the control arm rod is a rocker shaft (19), the rigidly mounted eccentrics (18) are connected to a first row of cylinders (5) and the rotatably mounted eccentrics (23) are connected to an adjacent row of cylinders.

25. The engine of claim 24, wherein:
the crankshaft (2) is rotatably coupled via a coupling (43) to the rocker shaft (19) in a ratio of 1:2, and the crankshaft (2) rotates at a speed twice as high as the rocker shaft (19) with its eccentricities, whereby the stroke of the piston (7) in an expansion stroke is longer than in a compression stroke.

26. The engine of claim 24, wherein the rigidly mounted eccentrics (18) and the rotatably mounted eccentrics (23) are configured to rotate in opposite directions during a change of compression ratio in the engine cylinders (5) in response to rotating the rocker shaft (19) and operation of the compression ratio mechanism.

* * * * *